United States Patent

[11] 3,598,298

[72] Inventor Walter C. Diener
 Oak Park, Ill.
[21] Appl. No. 875,880
[22] Filed Nov. 12, 1969
[45] Patented Aug. 10, 1971
[73] Assignee Illinois Tool Works Inc.
 Chicago, Ill.

[54] WEB CONVEYOR APPARATUS
 4 Claims, 3 Drawing Figs.
[52] U.S. Cl. .................................................... 226/173
[51] Int. Cl. ..................................................... B65h 17/34
[50] Field of Search ......................................... 226/170,
 173; 198/180

[56] References Cited
 UNITED STATES PATENTS
1,861,282 5/1932 Nelson ........................ 198/180
3,029,007 4/1962 Hepner ........................ 226/173

Primary Examiner—Allen N. Knowles
Attorneys—Robert W. Beart, Michael Kovac, Barry L. Clark and Jack R. Halvorsen ABSTRACT: Web conveyor apparatus for use in feeding a generally vertically oriented heated web of thermoplastic material to a container molding station wherein there is provided a plurality of conveyor clip devices which are mounted for movement along a predetermined path immediately above the upper margin of the web of thermoplastic material, each conveyor clip device including positive gripping and release features which assure accurate predetermined feeding of the web.

PATENTED AUG 10 1971  3,598,298
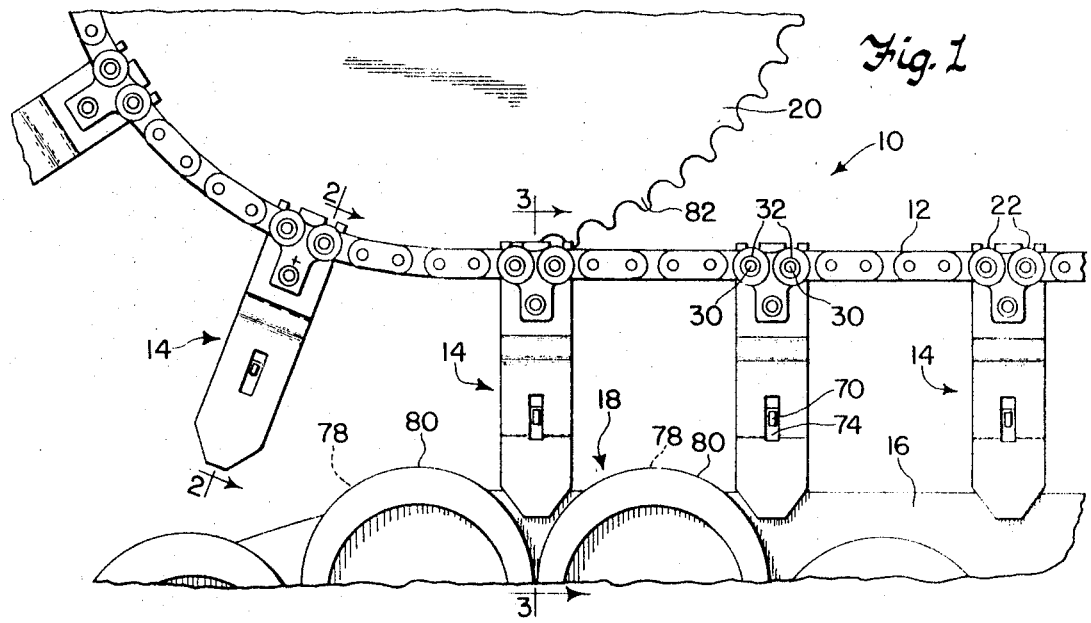
Fig. 1
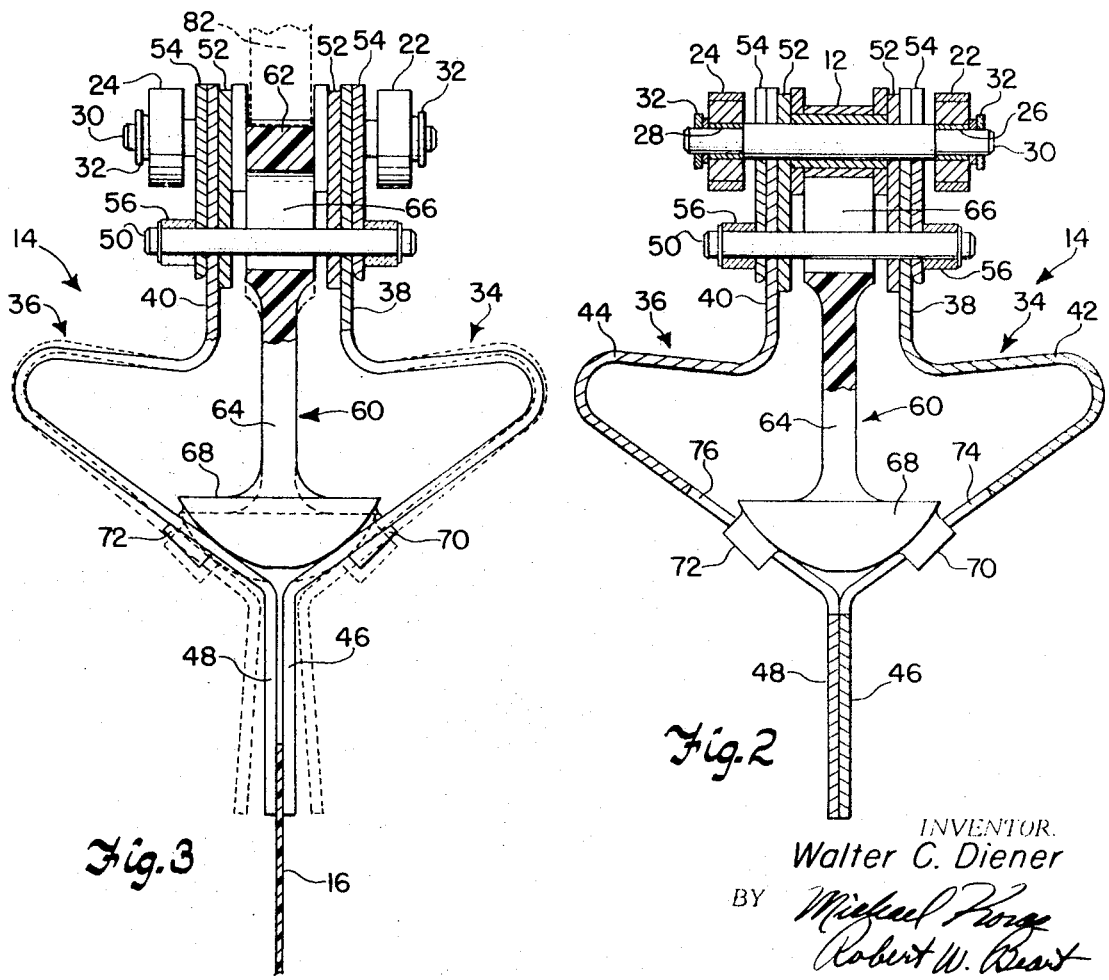
Fig. 2
Fig. 3
INVENTOR.
Walter C. Diener
BY Michael Krone
Robert W. Beart
His Att'ys

WEB CONVEYOR APPARATUS

This application is a companion to patent application Ser. No. 845,270, filed July 28, 1969, in the name of Bryant Edwards and assigned to the same assignee as the present application. Reference to this companion Edwards' application is made throughout the specification hereof in order to set forth the preferred environment in which the instant invention preferably operates.

As disclosed in the companion Edwards' application, a continuous motion container-molding machine and method is provided with cooperating molds which operate upon heated thermoplastic sheet or web material to form disposable containers. In general, the continuous molding machine or method includes the steps or means for feeding a heated thermoplastic web to at least one pair of continuously rotating cooperating molds, simultaneously attaching the web to the molds for predetermined, coincidental movement therewith and clamping off a predetermined material area from the remainder of the web, and then forming containers from the predetermined material area when attached to the cooperating molds.

In a method or machine of the type described, the heated thermoplastic web must be generally vertically oriented or positioned as it is fed from the supply roll to the continuously rotating cooperating molds at the molding station. For this purpose, the present invention contemplates a web conveyor apparatus which functions in the desired manner as will be discussed in detail below.

It is an object of the present invention to provide a web conveyor apparatus including one or more conveyor clip devices which assures predetermined feeding of a generally vertically oriented or positioned heated thermoplastic web.

Another object of the present invention is the provision of conveyor clip devices which positively grip and release a heated thermoplastic web for accurate, predetermined feeding thereof.

These and other objects and advantages of the present invention are attained by the provision of a conveyor clip device which is used for feeding a generally vertically oriented heated web of thermoplastic material to a container-molding station and including means for mounting the conveyor clip device immediately above the upper margin of the web for movement therealong, a pair of spring-biased clamping elements depending from the mounting means for engaging limited areas on opposite surfaces of the web along the upper margin thereof, and means for spreading the clamping elements after predetermined feeding of the web. The present invention also contemplates the use of a plurality of similarly configured conveyor clip devices of the type described above in conjunction with an endless mechanism upon which the conveyor clip devices are mounted in spaced relationship to one another.

Reference is now made to the drawing wherein:

FIG. 1 is a fragmentary side elevational view of a web conveyor apparatus, including a plurality of conveyor clip devices, which is constructed in accordance with the teachings of the present invention, the apparatus being shown as it delivers a heated web of material to a container-molding station and the subsequent disengagement of the conveyor clip devices after predetermined feeding of the web;

FIG. 2 is an enlarged partial elevational and sectional view of a web conveyor clip device as viewed along line 2-2 of FIG. 1; and FIG. 3 is also an enlarged partial elevational and sectional view as viewed along line 3-3 of FIG. 1 and illustrating in full lines the clamping of the heated web material, and in dotted lines the subsequent release thereof.

The web conveyor apparatus 10 of the present invention includes a driven endless chain 12 or other equivalent mechanism and a plurality of spaced, web conveyor clip devices 14 which are arranged to grip a heated web of thermoplastic material 16 along the upper margin thereof for predetermined feeding of the web 16 to a container-molding station partially shown at 18. Reference is made to the aforesaid Edwards' application for a specific description of the preferred form of container-molding station with which the web conveyor apparatus 10 of the present invention may be used.

The web conveyor clip means 14 are arranged to grip the upper margin of the generally vertically oriented web 16 which is being fed from a supply roll (not shown to the container-molding station 18. The endless chain 12 or other equivalent mechanism may be driven by sprocket wheels at opposite ends thereof such as the sprocket wheel 20 illustrated in FIG. 1 of the drawing. The sprocket wheel 20 with a specially configured tooth formation may also be used as will be described below in opening and/or closing the web conveyor clip devices 14.

Each of the web conveyor clip means 14 is arranged to grip in sequential fashion the web 16 of material adjacent the supply roll (not shown) and carry or feed the web 16 to the container-molding station 18 whereupon the conveyor clip devices are disengaged from the web 16 and then returned to the position where the web conveyor clip devices 14 can again engage and grip the web 16. It is important to note that each of the web conveyor clip devices 14 are designed to engage the web 16, as best seen in FIGS. 1 and 3 of the drawing, along limited upper marginal areas of the vertically oriented web 16 in a manner so as not to interfere with any of the clamps and molds of the continuous-molding station 18.

Each of the web conveyor clip means 14 is provided with a pair of free-rotating rollers 22, 24 which are mounted on opposite sides of the endless chain 12. Each pair of rollers 22, 24 are mounted in a closed, endless track (not shown) to prevent sagging of the endless chain 12. The opposed pairs of rollers 22, 24 are mounted in the plane of the endless chain 12 and are supported on bushings 26, 28 which are mounted at opposite ends of the shafts 30. Fastening means in the form of a C-retaining ring 32 or the like prevents lateral movement and disassembly of the rollers 22, 24 relative to the shafts 30. As best seen in FIG. 2 of the drawing, the shafts 30 extend through the endless chain 12 and thus are carried thereby along with the associated pairs of rollers 22, 24.

For clamping the web 16 along the upper margin thereof, a pair of spring-biased clamping elements 34, 36 are provided. The clamping elements 34, 36 are configured and mounted relative to the endless chain 12 to provide upper sections 38, 40 respectively which are generally parallel to each other, middle body sections 42, 44 respectively which generally have a sear spring shape, and a pair of lower sections 46, 48 which function to clamp the web 16 as will be presently described. The upper body sections 38, 40 of the clamping elements 34, 36 respectively have suitably aligned upper and lower openings for receiving the pairs of shafts 30 and the single lower shaft 50. Two pairs of retaining plates 52, 54 are mounted on the pair of shafts 30 and shaft 50 on opposite sides of the upper sections 38, 40 respectively of the clamping elements 34, 36. Nuts 56 threadably associated with the shaft 50 engage the outer plate of each of the pairs of retaining plates 52, 54 and clamp the upper sections 38, 40 against the inner plates of the pairs of retaining plates 52, 54, the in inner plate in each pair of retaining plates 52, 54, in turn, being supported by the endless chain 12 along outer faces thereof as indicated in FIGS. 2, 3 of the drawing. This provides a stable and secure mounting for each clamping element 34, 36 relative to the endless chain 12.

The clamping elements 34, 36, when mounted to the endless chain 12 in the manner just described, enable the sear spring-shaped middle body sections 42, 44 respectively to maintain the lower clamping sections 46, 48 in a closed position as best illustrated in FIG. 2 of the drawing. Thus, the clamping elements 34, 36 are normally spring biased to a closed position to assure gripping of the web 16 for the unimpeded delivery thereof.

In order to open the lower clamping sections 46, 48 of the clamping plates 34, 36 respectively to permit the engagement and disengagement with respect to a web 16, there is provided a plunger element 60 associated with each web conveyor clip means 14. Each plunger element 60 includes a head portion 62 and an elongated shank 64 having a vertical slot 66 therein for mounting the plunger 60 relative to the shaft 50 while permitting limited vertical movement thereof, and an enlarged foot section 68 with integral wing elements 70, 72 which are mounted in longitudinal openings 74, 76 of the sear spring-shaped middle body sections 42, 44. The limited vertical movement of each plunger 66, permitted by the vertical slot 66, is complemented by the spherical shape on the lower face of the enlarged foot section 68 which, when the plunger 60 is depressed, moves the downwardly and inwardly tapering portions of the middle body sections 42, 44 apart from one another to open up the clamping sections 46, 48 as is illustrated in FIG. 3 of the drawing. The wing elements 70, 72 move within the longitudinal openings 74, 76 when this occurs, thereby assuring stability to the plunger element 60 during its movement. Upward movement of a plunger element 60 will then cause the sear spring-shaped middle body section 42, 44 to move the clamping sections 46, 48 respectively to their normally clamped or closed position. The plunger elements 60 are depressed adjacent the supply roll (not shown) in order to permit the web conveyor clips 14 to grip the web 16 adjacent the upper margin thereof and also after the web 16 has been clamped to the container-molding station 18 by opposed circumferential web-clamping means 78, 80, only partially shown. While any suitable means may be employed for this purpose, it has been found that a sprocket wheel 20 with a specially configured tooth formation 82 is very effective in engaging the heads 62 of the plunger elements 60 and depressing them at the desired moment.

Although a specific embodiment of the present invention has been shown and described, it is with full awareness that many modifications thereof in addition to those specifically mentioned are possible. The invention, therefore, is not to be restricted except in so far as is necessitated by the prior art and by the spirit of the appended claims.

I claim:

1. A conveyor clip device for use in feeding a generally vertically oriented heated web of thermoplastic material to a container-molding station comprising means for mounting said conveyor clip device immediately above the upper margin of said web for movement therealong, a pair of spring-biased clamping elements depending from said mounting means and having cooperating lower tip portions for engaging limited areas on opposite surfaces of said web along the upper margin thereof, spreader means carried on said mounting means for limited reciprocating movement and positioned between and engaging said pair of clamping elements above said tip portions, whereby said tip portions are opened and closed responsive to reciprocating movement of said spreader means.

2. A conveyor clip device as defined in claim 1, wherein said spring-biased clamping elements immediately above said tip portions are formed to diverge upwardly, and the lower end of said spreader means comprising a head portion formed to have downward converging surfaces cooperating with the upwardly diverging portions of said spring-biased clamping elements so that said tip portions are opened and closed responsive to reciprocating movement of said spreader means.

3. A conveyor clip device as defined in claim 2, wherein the upwardly diverging portions of said spring-biased elements are provided with vertically extending slots therethrough, and said head portion of said spreader means having wing elements mounted thereon and positioned within said slots for reciprocating movement within said slots responsive to reciprocating movement of said spreader means.

4. In combination, a plurality of conveyor clip devices as defined in claim 1, an endless mechanism for carrying said devices, said mounting means of said devices carrying said devices on said endless mechanism in a spaced predetermined relationship to each other, and means for moving said spreader means.